United States Patent [19]
Birch et al.

[11] Patent Number: 5,261,289
[45] Date of Patent: Nov. 16, 1993

[54] HIGH REDUCTION GEAR ASSEMBLY WITH LUBRICATION

[75] Inventors: Peter H. Birch; Toshiyuki Kondo; Shinji Kono, all of Brighton, United Kingdom

[73] Assignee: Aisin Seiki Kabushiki Kaisha, Kariya City, Japan

[21] Appl. No.: 868,661

[22] Filed: Apr. 15, 1992

[30] Foreign Application Priority Data

Apr. 16, 1991 [GB] United Kingdom ............... 9108071
Apr. 16, 1991 [GB] United Kingdom ............... 9108084

[51] Int. Cl.⁵ .......................... F16H 1/10; F16H 1/12
[52] U.S. Cl. ................................ 74/421 A; 74/413; 74/421 R
[58] Field of Search ............. 74/421 A, 421 TA, 413, 74/421 R; 475/33, 159

[56] References Cited

U.S. PATENT DOCUMENTS

| | | | |
|---|---|---|---|
| 1,010,976 | 12/1911 | Sundh | 74/421 A X |
| 3,821,908 | 7/1974 | Marsch et al. | 475/159 X |
| 4,072,067 | 2/1978 | Benthake | 74/713 R |
| 4,105,372 | 8/1978 | Mishina et al. | 74/421 A X |
| 4,108,015 | 8/1978 | Yanke | 74/421 A X |

FOREIGN PATENT DOCUMENTS 1288652 11/1989 Japan .
0798273 7/1958 United Kingdom .

*Primary Examiner*—Leslie A. Braun
*Assistant Examiner*—Daniel Wittels
*Attorney, Agent, or Firm*—Sughrue, Mion, Zinn, Macpeak & Seas

[57] ABSTRACT

An epicyclic gear comprises housing, pinion forming on an input shaft supported in the housing, at least three planetary gears supported in the housing via shafts and geared with the pinion, an internal gear supported in the housing via an output shaft and surrounding and geared with the planetary gears, a passage for lubricating oil through the housing into the shafts of the planetary gears, a conduit supported on at least one shaft and for conveying oil from the shafts towards the center of the housing via outlet jets, and a bridge supported between at least two shafts and supporting the outlet jets, wherein at least one planetary gear overlaps the remaining adjacent planetary gears in an axial direction of the pinion without mutual interfering with each other.

3 Claims, 5 Drawing Sheets

HIGH REDUCTION GEAR ASSEMBLY WITH LUBRICATION

BACKGROUND OF THE INVENTION

1. Field of the Invention

The present invention relates to an epicyclic gear for high ratio reduction of the output rotational speed of a high-speed machine such as a gas-turbine, and as an increaser for stepping up the output rotational speed of a low-speed machine such as a motor, and having a suitable lubricating mechanism.

2. Description of the Related Art

Patent Specification of Japanese Patent Laid-open No. 1(1989)-288652 describes an epicyclic gear 700 in which it is possible to enlarge the reduction ratio or the increase ratio without interference of the planetaries as in epicyclics in which the pinion 701 and the internal gear 702 are engaged with three planetary gears 703, 704 and 705 in a single plane. It is shown in FIG. 8. When the ratio between the pinion 701 and the internal gear 702 is as high as 17 to 1, the epicyclic gear 700 has to incorporate at least two stages 706, 707 in order to prevent interference as shown in FIG. 9.

As a result, the epicyclic gear 700 has to be enlarged and the mechanical efficiency is negative by the increase in the number of gears. If only two planetary gears are engaged with the pinion and the internal gear, the epicyclic gear does not have the above drawbacks. However, the support of the pinion due to the engaging portion between the pinion and the planetary gear and the support of the internal gear due to the engaging portion between the internal gear and the planetary gears becomes unstable. An unbalanced load is apt to operate on each bearing supporting the pinion and the internal gear, and there is a danger of damage to the bearings at an early stage.

On the other hand, in pressure or forced lubrication, engaging portions of gears are lubricated by the supply of oil from a pump via an oil-jet. In oil bath lubrication, a part of a gear is steeped in oil which is stored in the casing, and the engaging portions of the gears are lubricated by the rotation of the gears.

In forced lubrication, the cooling efficiency is high and it is possible to lubricate the engaging portions of gears precisely. In an epicyclic gear as disclosed in Patent Specification of Japanese Patent Laid-open No. 1(1989)-288652, the oil passage is complicated and it is difficult to arrange the oil-jet at the most suitable position. Therefore, oil bath lubrication is adopted for gears of this kind.

Since it is not possible to limit the quantity of oil to that which is required to lubricate the engaging portions of the gears, the cooling efficiency of oil bath lubrication type is low. Also the mechanical efficiency of the gear is lowered by the mixing loss of the oil. Furthermore, depending on the structure of gears, there is a possibility that the engaging portions of the gears are not fully lubricated, and there is a danger of generating a partial discontinuity of the oil film in the engaging portions. At high rotational speeds, the oil is splashed outward by centrifugal forces, and there is a danger of generating a discontinuity of the oil film in the engaging portions at the center.

SUMMARY OF THE INVENTION

Accordingly, it is a primary object of the present invention to provide an epicyclic gear high ratio reduction.

Further, it is an other object of the present invention to assemble a suitable lubricating mechanism into the epicyclic gear.

The above and other objects are achieved according to the present invention by an epicyclic gear which comprises a housing, a pinion forming on an input shaft supported in the housing, at least three planetary gears supported in the housing via shafts and geared with the pinion, an internal gear supported in the housing via an output shaft and surrounding and geared with the planetary gears, a passage for lubricating oil through the housing into the shafts of the planetary gears, a conduit supported on at least one shaft and for conveying oil from the shafts towards the center of the housing via outlet jets, and a bridge supported between at least two shafts and supporting the outlet jets, wherein at least one planetary gear overlaps the remaining adjacent planetary gears in an axial direction of the pinion without mutual interfering with each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
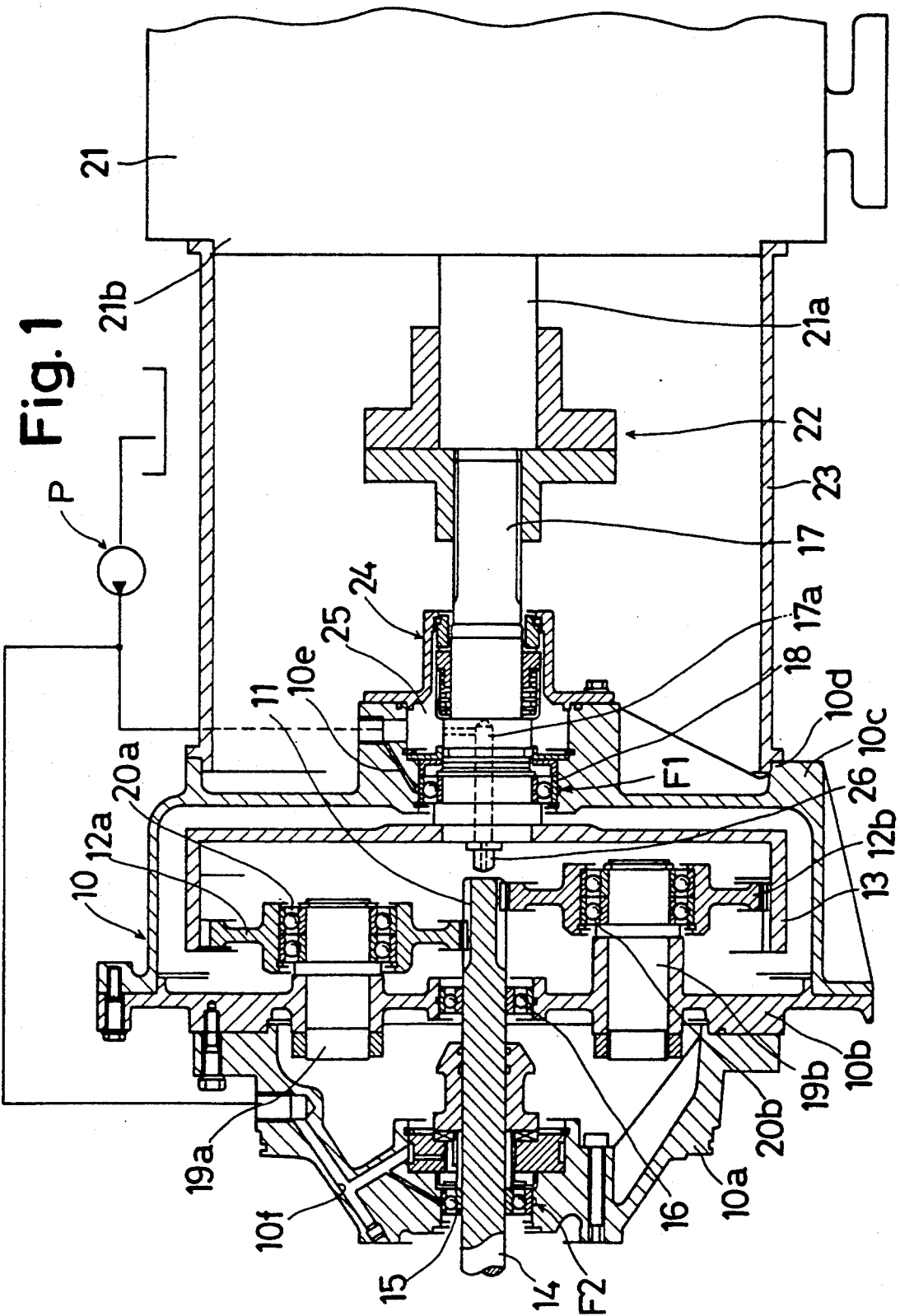
FIG. 1 is a cross section of an epicyclic gear according to the invention.
Figure 2:
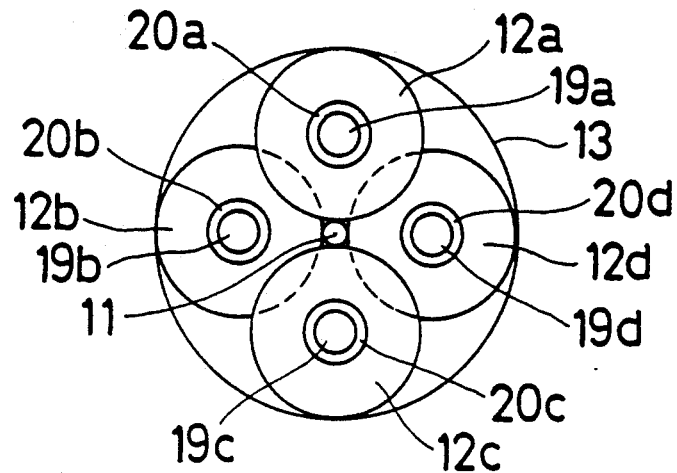
FIG. 2 is a schematic side view of the gear in FIG. 1.

Referring first to FIGS. 1 and 2, a casing 10 contains a pinion 11, planetary gears 12a, 12b, 12c and 12d and an internal gear 13. The casing 10 comprises: a first housing member 10a supporting an input shaft 14, on which the pinion 11 is formed on one end, via a bearing 15; a second housing member 10b fixed to the first housing member 10a and supporting the input shaft 14 via a bearing 16; and a cup-shaped third housing member 10c, fixed to the second housing member 10b, and supporting an output shaft 17, which is formed on the internal gear 13, in a body via bearing 18. The pinion 11 and the planetary gears 12a, 12b, 12c and 12d are located in a space which is formed between the internal gear 13 and the second housing 10b.

The pinion 11 is engaged at its outer circumference with the planetary gears 12a, 12b, 12c and 12d and the planetary gears 12a, 12b, 12c and 12d are supported on shafts 19a, 19b, 19c and 19d which are fixed on the second housing member 10b at 90-degree intervals and in two planes: the planetary gears 12a, 12c being in one plane and opposite each other across the pinion 11, and the planetary gears 12b, 12d similarly in another plane. The adjacent planetary gears overlap in the axial direction of the pinion 11 without interfering with each other. The internal gear 13 is cup-shaped and surrounds and engages the planetary gears 12a, 12b, 12c and 12d so that the rotational speed of the input shaft 14 is reduced by the pinion 11, the planetary gears 12a, 12b, 12c and 12d and the internal gear 13 before transmission to the output shaft 17.

The output shaft 17 is connected with a shaft 21a of a generator 21 via a coupling 22. A collar 23 is interposed between the third housing member 10c and the generator 21 and contains the output shaft 17, the shaft 21a and the coupling 22. Both ends of the collar 23 are fitted on projections 10d, 21b respectively on the third housing member 10c and the generator 21. The collar 23 maintains concentricity of the axial shafts 17, 21a, so it is possible to eliminate the bearing 18 or the coupling 22.

A mechanical seal 24 on the outer circumference of the output shaft 17 is fixed to the end of the third housing member 10c. An oil chamber 25 fed from an oil pump P is formed between the mechanical seal 24 and the third housing member 10c. The oil chamber 25 feeds an oil jet 26 near the center of the internal gear 13 via a passage 17a in the output shaft 17. Oil is supplied to the engaging portion between the pinion 11 and the planetary gears 12a, 12b, 12c and 12d, and to the engaging portion between the internal gear 13 and the planetary gears 12a, 12b, 12c and 12d, so both are lubricated. The chamber 25 is connected to the outer circumference of the bearing 18 by an oil passage 10e in the third housing member 10c. A squeeze film F1 is formed at the outer circumference of the bearing 18 and absorbs the deflection of the output shaft 17 in the radial direction.

The oil pump P is connected to outer circumference of the bearing 15 by an oil passage 10f in the first housing member 10a. A squeeze film F2 is formed at the outer circumference of the bearing 15 and absorbs the radial deflection or high-frequency vibration of the input shaft 14. A squeeze film (not shown) is formed at the outer circumference of the bearing 16 like the squeeze films F1, F2. Even though the input shaft 14 and the internal gear 13 (output shaft 17) which are supported in two planes by planetary gears are subjected to the bending action, the bending action is absorbed by the squeeze films. Therefore, it is not necessary to maintain high accuracy of gears, and it is possible both to reduce manufacturing cost and ensure smooth rotation of the gears.

In FIGS. 1, 2, adjacent planetary gears overlap each other in the axial direction of the pinion 11 without interfering with each other. Furthermore, the planetary gears 12a, 12b, 12c and 12d engage with the pinion 11 and the internal gear 13 at regular angular intervals. Thus a high reduction ratio is obtained while ensuring stable support without enlarging the size of the gear, and without negativing its mechanical efficiency or reliability. The rotational speed of the input shaft 14 is reduced by the pinion 11, the planetary gears 12a, 12b, 12c and 12d and the internal gear 13; for example a rotational speed of 50,000 rpm of the input shaft 14 can be reduced to the 3,000 rpm in the output shaft 17. Since the pinion 11 is stably supported in the X and Y axial directions, it is possible to simplify the structure by elimination of the bearing 16. The structure may be such that the planetary gears 12a, 12b, 12c and 12d either revolve or do not revolve about the pinion 11.

Figure 3:
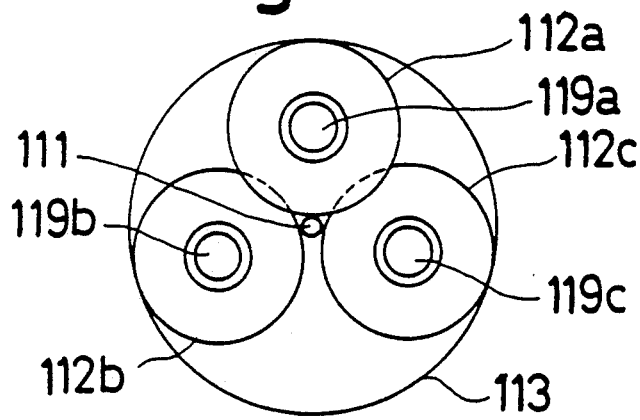
FIGS. 3 and 4 are schematic side views of modifications to FIG. 2 according to the invention.
Figure 4:
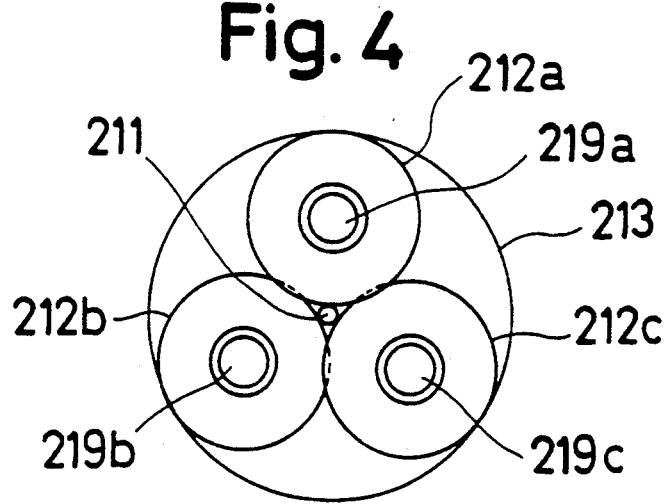

FIGS. 3, 4 show a gear ratio between a pinion and planetary gears changed so as to be able to obtain a higher reduction ratio or a higher increase ratio. In FIG. 3, three planetary gears 112a, 112b and 112c are engaged with a pinion 111 and an internal gear 113. A planetary gear 112a is supported on a shaft 119a separate from the planetary gears 112b, 112c and overlapping them in the axial direction of the pinion 111. The planetary gears 112b, 112c are rotatably supported on shafts 119b, 119c in the same axial plane.

In FIG. 4, three planetary gears 112a, 112b and 112c are engaged with a pinion 111 and an internal gear 113. The planetary gears 212a (212b, 212c) are supported on a shaft 219a (219b, 219c) at 120-degree intervals, and in three planes overlapping with adjacent planetary gears. The support structure shown in FIG. 4 is more stable than that shown in FIG. 3. The remainder of the operation and the effect are the same.

Figure 5:
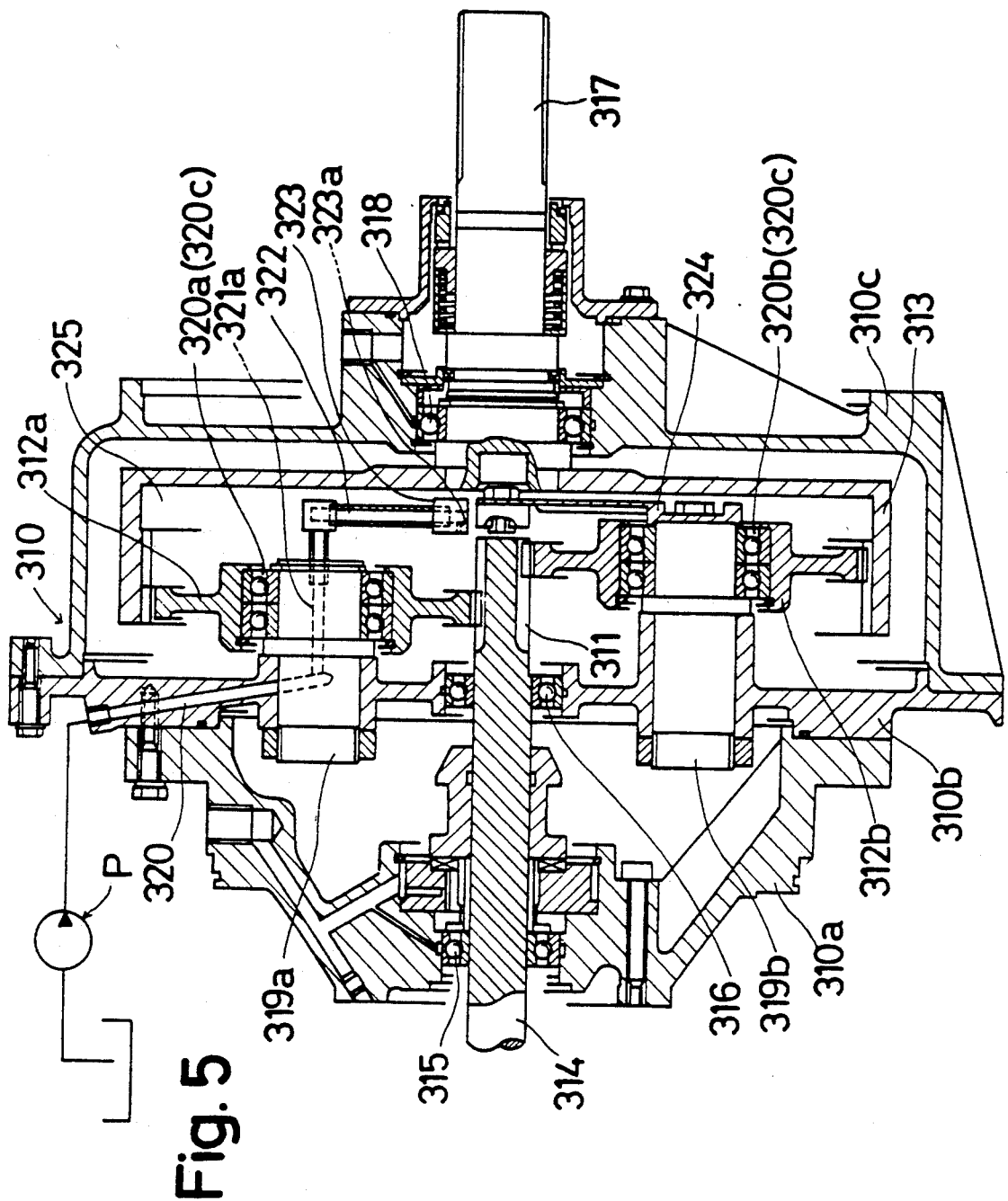
FIG. 5 is a cross section of an epicyclic gear according to the invention.
Figure 6:
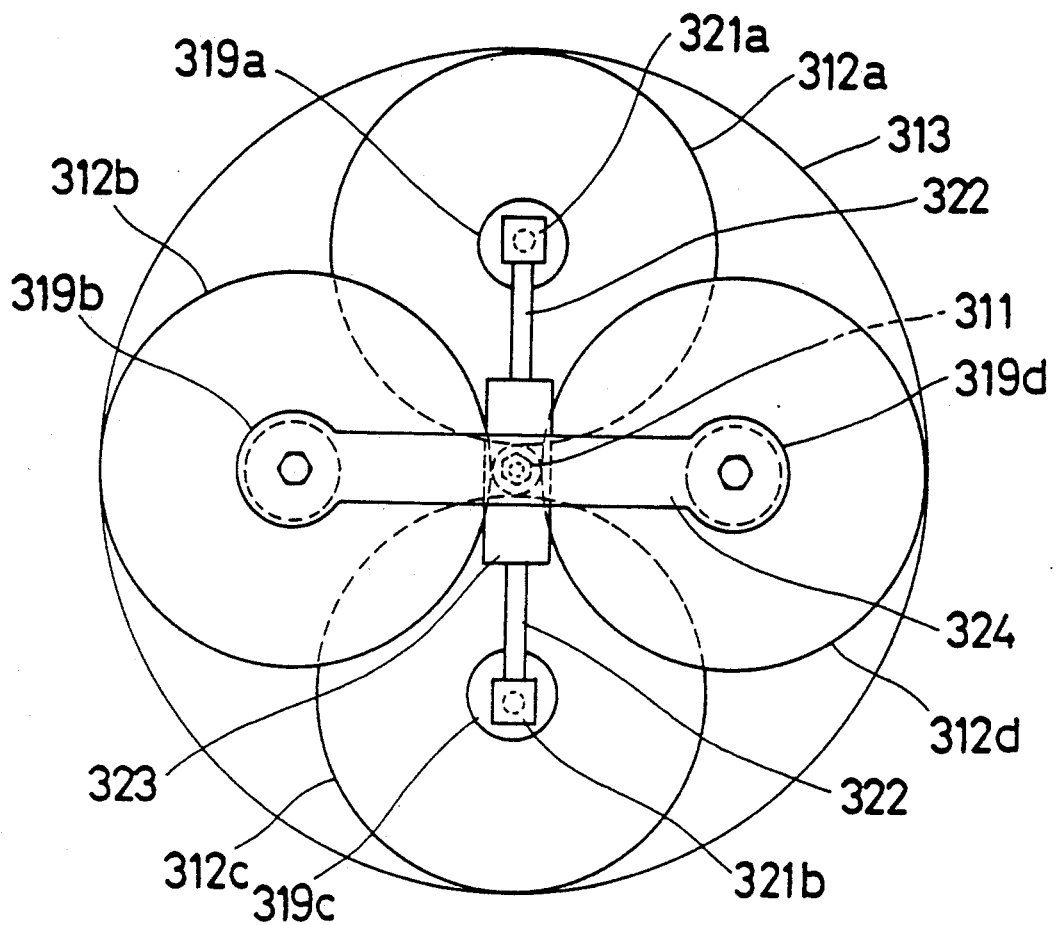
FIG. 6 is a schematic view of the gear in FIG. 5.

Next, referring to FIGS. 5 and 6, a casing 310 contains a pinion 311, planetary gears 312a, 312b, 312c and 312d, an internal gear 313, oil passages 321a, 321b, an oil supply conduit 322 and a bridge 324. The casing 310 is composed of a first housing member 310a rotatably supporting an input shaft 314 via a bearing 315 on which the pinion 311 is formed at one end, a second housing member 310b fixed to the first housing member 310a and rotatably supporting the input shaft 314 via a bearing 316, and a cup-shaped third housing member 310c fixed to the second housing member 310b and rotatably supporting an output shaft 317 via a bearing 318 which is part of the internal gear 313. Thus the pinion 311 and the planetary gears 312a, 312b, 312c and 312d are located in a space between the internal gear 313 and the second housing member 310b.

The pinion 311 is engaged at its outer circumference with the planetary gears 312a, 312b, 312c and 312d, and the planetary gears are rotatably supported on shafts 319a, 319b, 319c and 319d fixed on the second housing member 310b at 90-degree intervals and in two planes: the planetary gears 312a, 312c being in one plane opposite each other across the pinion 311, and the planetary gears 312b, 312d similarly in another plane. The adjacent planetary gears overlap in the axial direction of the pinion 311 without interfering with each other. The internal gear 313 is cup-shaped and surrounds and engages the planetary gears 312a, 312b, 312c and 312d so that the rotational speed of the input shaft 314 is reduced by the pinion 311, the planetary gears 312a, 312b, 312c and 312d and the internal gear 313 before transmission to the output shaft 317.

A passage 320 in the second housing member 310b is fed from an oil pump P outside of the casing 310, and leads to oil passages 321a, 321b in the shafts 319a, 319c, respectively. The other ends of the oil passages 321a, 321b open into a space 325 between the internal gear 313 and the planetary gears 312a, 312b, 312c and 312d through the conduit 322. The conduit 322 is provided with a junction 323 which has a plurality of outlet jets 323a for lubricating the engaging portion between the pinion 311 and the planetary gears 312a, 312b, 312c and 312d. The junction 323 is fixed to the bridge 324 which spans between the shafts 319b, 319d.

The planetary gears 312a, 312b, 312c and 312d engage with the pinion 311 and the internal gear 313 at regular intervals without interfering with each other, so it is possible to obtain a high reduction ratio with stable support and without a complicated structure.

Oil is introduced from the oil pump P into the space 325 via the passages 320, 321a and 321b and the junction 323 is fixed to the bridge 324 to prevent the direction of the oil jets 323a from changing due to vibration. Thus oil is easily introduced into the space 25, which is dead space, without any complicated structure, and the junction 323 can easily be arranged at most suitable orientation on the conduit 322. Accordingly, it is possible to lubricate the engaging portions of gears effectively without mixing loss or lubrication failure. The position of the junction 323 can easily be changed to ensure lubrication of the engaging portion between the internal gears 313 and the planetary gears 312a, 312b, 312c and 312d. Furthermore, the oil effectively cools the input shaft 314 and other components. For example, for cooling of the input shaft 314 or the output shaft 317, the position of the oil jets 323a can be changed to the center of the shafts, and the shafts can be hollowed out. Small quantities of oil for lubrication only can be passed through a single passage in one shaft member as in FIG. 7.

Figure 7:
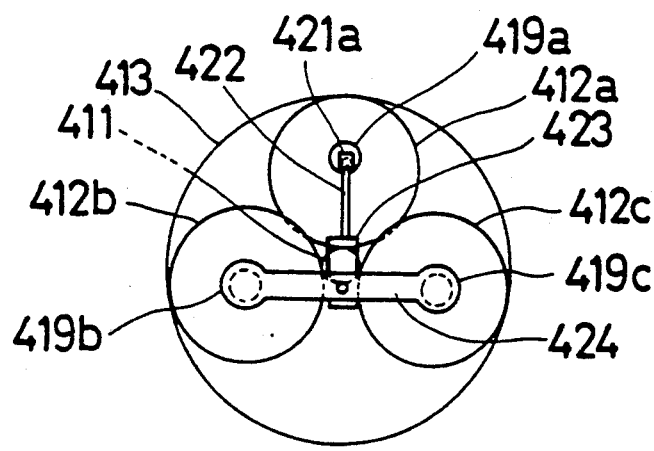
FIG. 7 is a similar view of another gear according to the invention.
Figure 8:
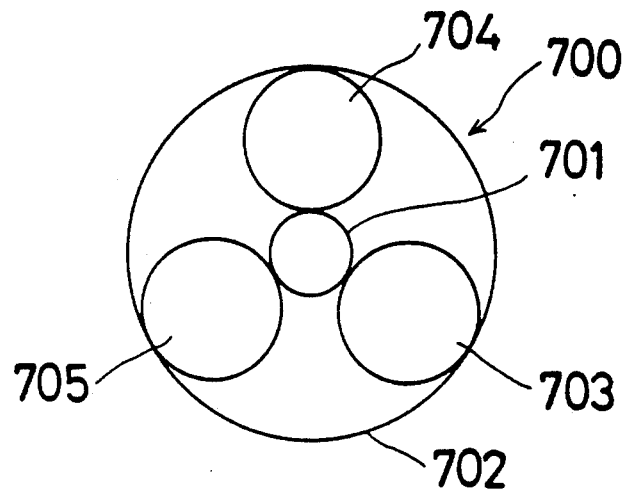
FIGS. 8 and 9 are schematic illustrations of the prior art gears.
Figure 9:
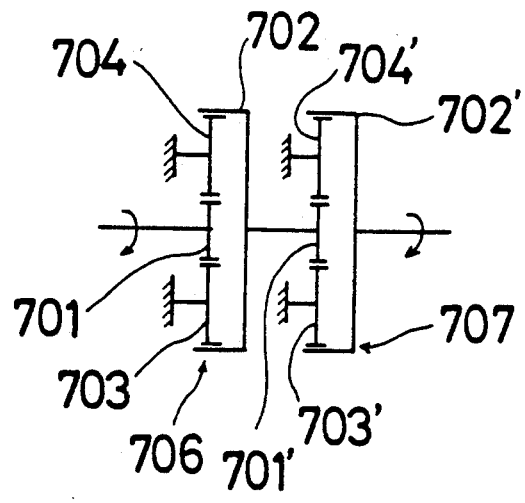

In FIG. 7, three planetary gears 412a, 412b and 412c engage with a pinion 411 and an internal gear 413. One of the planetary gears 412a is supported on a shaft 419a and in a separate plane from the planetary gears 412b, 412c overlapping in an axial direction of the pinion 411 the planetary gears 412b, 412c. The planetary gears 412b, 412c are supported on shafts 419b, 419c in the same plane as each other. An oil passage 421a is formed in the shaft 419a. The passage 421a is fed from a passage in a second housing member and an oil pump (not shown) as in FIG. 5. The other end of the passage 421a leads to an oil supply conduit which has an oil jet 423. The oil jet 423 is fixed to a bridge 424 which spans between the shafts 419b, 419c. Oil is effectively supplied to the engaging portion between the pinion 411 and the planetary gears 412a, 412b and 412c, via the oil passage 421a, the oil supplying conduit 422 and the oil jet 423.

Further detail can be found in the earlier Specification mentioned above.

Obviously, numerous modifications and variations of the present invention are possible in light of the above teachings. It is therefore to be understood that within the scope of the appended claims, the invention may be practiced otherwise than as specifically described herein.

What is claimed is:

1. A gear assembly comprising:
   a housing,
   a first shaft rotatably supported in said housing,
   at least three external gears rotatably supported in said housing on respective independent shafts and disposed in meshing engagement with a pinion, and
   an annular internal gear rotatably supported in said housing on a second shaft and surrounding and disposed in meshing engagement with each of said external gears,
   wherein at least one of said external gears is disposed in overlapping relation with respect to adjacent external gears in an axial direction of said pinion without mutual interference with each other.

2. A gear assembly as set forth in claim 1, wherein four external gears are supported on respective independent shafts at 90° intervals with a pair of external gears disposed on opposite sides of said pinion being disposed in a common plane.

3. A gear assembly as set forth in claim 1, further comprising a bridge member supported by and extending between at least two of said independent shafts, an oil passage formed in at least one of said independent shafts for communication with an oil pump at one end of said oil passage with an opposite end of said oil passage being disposed inside said housing, and
   an oil supplying conduit having an oil jet secured to said bridge member and disposed in communication with said opposite end portion of said oil passage.

* * * * *